April 17, 1928. 1,666,372
J. FEJES
VEHICLE BRAKE
Original Filed May 28, 1926   2 Sheets-Sheet 2

J. Fejes INVENTOR

By Marks & Clerk
ATTYS.

Patented Apr. 17, 1928.

1,666,372

UNITED STATES PATENT OFFICE.

JENÖ FEJES, OF BUDAPEST, HUNGARY.

VEHICLE BRAKE.

Original application filed May 28, 1926, Serial No. 112,343. Divided and this application filed December 30, 1926. Serial No. 158,068.

This invention relates to an improved construction of brakes as described in my copending application Serial No. 112,343 of which this application is a division and their mounting more particularly on the rear axle of a motor or other vehicle.

The main object of the invention is so to construct and mount the brakes and parts associated therewith that their dynamic forces and in consequence thereof also the vibrations which are usually transmitted by the said dynamic forces to the main springs, chassis frame, etc. are substantially reduced.

This main object is attained by making the supporting frame of strips of sheet iron welded together as hereinafter more particularly described. By thus constructing the supporting frame, its weight and consequently its forces of inertia are greatly reduced as compared with the forces of inertia which are produced when the supporting frame is much heavier as has been the case with the constructions hitherto employed.

The construction according to the present invention has the further advantage that the heat is rapidly radiated and overheating entirely prevented. A still further advantage consists in the great reduction in the cost of manufacture which is due not only to the smaller price of the material as compared with the material hitherto employed but also to the facts that as the vibrations to which the vehicle is subjected are substantially reduced, the various parts of the vehicle, such as the main springs, can be made of smaller dimensions for the same factor of safety, and as the heat is so readily radiated no extra provision has to be made for cooling the brakes in order to prevent overheating.

It is also to be pointed out that owing to the masses of the movable parts being much lighter than the masses of the brakes hitherto employed, the efficiency of the improved brake is correspondingly increased.

Another object of the invention is to facilitate the mounting of the brakes and this object is attained by assembling the brake shoes together with their operating spindles, and supporting frame, and preferably also the main springs of the vehicle on a supporting boss so as to form a self-contained unit which can easily be slid on and secured to the tubular outer casing of the rear axle of the vehicle.

Figure 1:
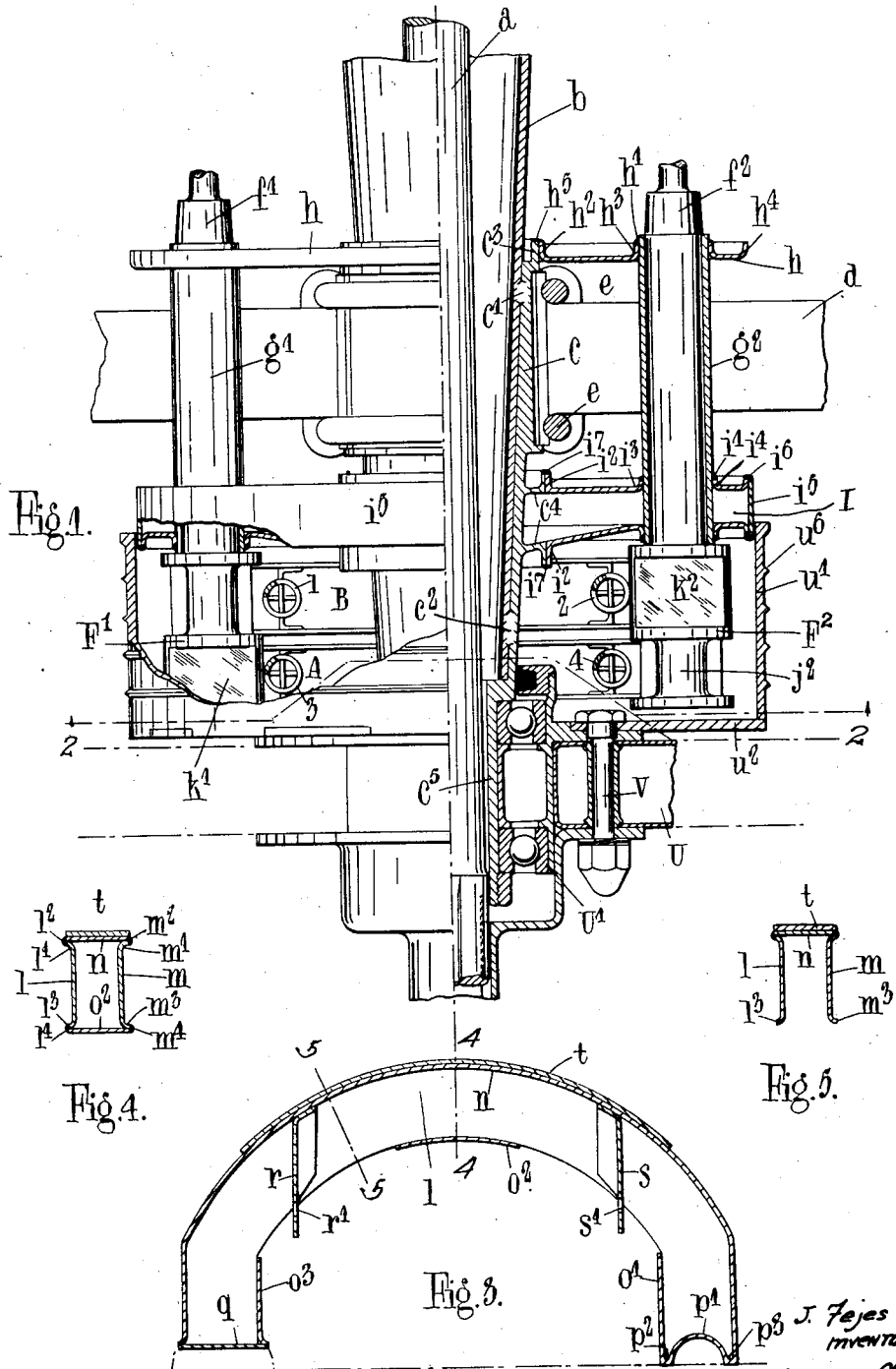
Figure 2:
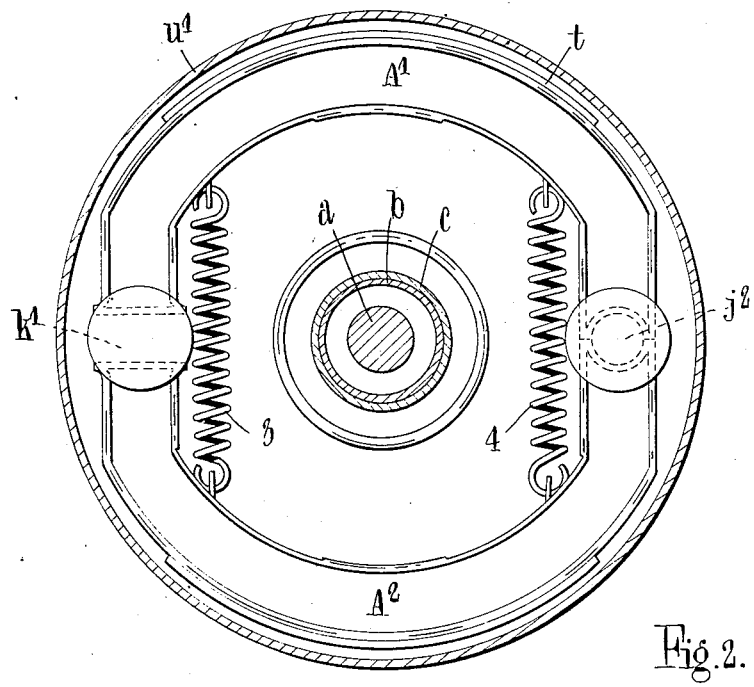
Figure 6:
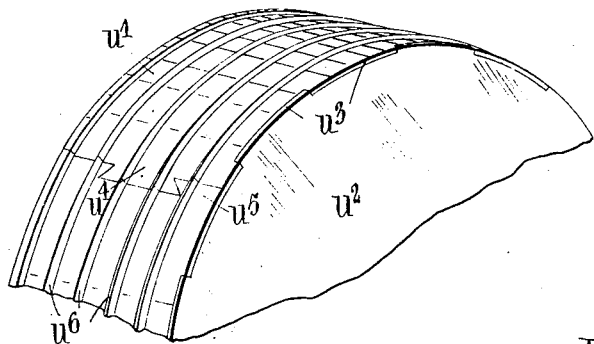
Figure 7:
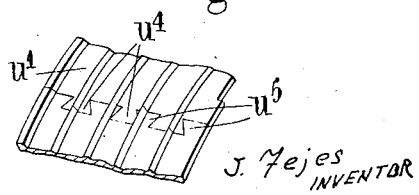

Referring to the accompanying drawings which illustrate the invention by way of example, Figure 1 is a part sectional plan of the improved construction and mounting of brake and parts associated therewith as applied to the rear axle of a motor vehicle, Figure 2 is a section along the line 2—2 in Fig. 1, Figure 3 is a sectional elevation of one of the brake shoes, Figures 4 and 5 are transverse sections along the lines 4—4 and 5—5 in Figure 3 respectively, Figure 6 is a perspective view of a portion of the brake drum, whilst, Figure 7 is a detail illustrating a modification of the joint of the cylindrical part of the brake drum.

$a$ is portion of one half of the driving axle and $b$ a portion of the tubular outer casing thereof. $c$ is a wrought iron boss on which the parts hereinafter more particularly referred to are mounted and which after the said parts have been attached thereto is slid onto the tubular outer casing $b$ and is spot welded to the said casing, for instance at $c_1$ and $c_2$. $d$ is one of the main plate springs which is fitted onto the boss $c$ by the usual means of connection, $e$ being fixing bolts. $f_1$, $f_2$ are two operating spindles intended to be connected in the usual way through the intermediary of operating levers and connecting rods (not shown) respectively to a hand lever and pedal provided at the front of the vehicle. The operating spindles $f_1$, $f_2$ are respectively mounted in tubes $g_1$, $g_2$ which are carried by two sheet metal supports $h$ and $I$ to which they are welded as shown at $h_1$ and $i_1$. The sheet metal support $h$ is flanged as shown at $h_2$, $h_3$ and $h_4$, whilst the sheet metal support I is constructed in the form of a hollow box, being constituted of two annular metal sheets and a peripheral sheet metal band $i_5$, the two metal sheets being flanged as indicated at $i_2$, $i_3$ and $i_4$ and the peripheral band $i_5$ being edge welded thereto as indicated at $i_6$. The boss $c$ is provided with annular flanges $c_3$ and $c_4$ to which the sheet metal supports $h$ and I are edge welded as shown at $h_5$ and $i_7$ respectively.

A and B are the two brakes, each comprising a pair of shoes, such as shown at $A_1$ and $A_2$ in Figure 2. The pair of shoes of the brake A are mounted on the spindles $f_1$, $f_2$ in such a manner as to surround at one side the cylindrical portion $j_2$ of the spindle $f_2$ and abut at the other side against flat surfaces provided on a cam portion $k_1$ formed on the spindle $f_1$, whilst the shoes of the brake B are mounted in such a manner as to abut at one side against the flat surfaces of a cam portion $k_2$ formed on the spindle $f_2$ and at the other side surround a cylindrical portion $j_1$ of the spindle $f_1$. The two pairs of brakes are held in their normal inoperative position by means of springs 1, 2, 3, 4 and their operation is effected in the usual way by the rotation of the cam portions $k_1$, $k_2$ when the spindles $f_1$, $f_2$ are operated by the brake lever and pedal. $F_1$ and $F_2$ are two disc-shaped portions of the spindles $f_1$, $f_2$ which separate the cam portion $k_1$ or $k_2$ from the cylindrical portion $j_1$ or $j_2$.

The actual construction of the brake shoes is shown in Figures 2-5. Each brake shoe consists of two flanged side strips $l$, $m$ of sheet metal and an outer peripheral strip $n$ also of sheet metal which is edge welded onto the flanges $l_1$, $m_1$, of the side strips as shown at $l_2$ and $m_2$ respectively. The shoe is reinforced by inner strips of sheet metal $o_1$, $o_2$, $o_3$ which are edge welded onto the flanges $l_3$, $m_3$ of the side strips as shown for instance at $l_4$, $m_4$ in connection with the strip $o_2$. The one end of the brake shoe is formed with a half cylindrical portion $p$, of sheet metal provided with extensions $p_2$, $p_3$ and welded onto the four strips $l$, $m$, $n$, and $o_1$, whilst the other end thereof is provided with a sheet metal strip $q$ which is edge welded onto the four strips. $r$ and $s$ are further strengthening means of sheet metal provided in the interior of the shoe and welded onto the side strips $l$, $m$ and outer strip $n$, the said strips $r$ and $s$ serving to receive the ends of the springs 1, 2, 3, 4, for which purpose they are provided with eyes $r_1$, $s_1$. $i$ is the usual strip of friction material which is suitably secured to the strip $n$.

The brake drum is also made of sheet metal and it comprises in addition to the cylindrical brake portion $u_1$ a disc-like portion $u_2$ by which it is secured in the usual manner, such as by bolts $v$, to the wheel U of the vehicle, which is mounted on an extension $c_5$ of the boss $c$ in the usual way through the intermediary of ball bearings $U_1$. The two portions $u_1$ and $u_2$ of the brake drum are dove-tailed into one another as shown at $u_3$, being edge-welded all along the adjoining edges of the dove-tail connections. The cylindrical portion $u_1$ of the drum is made of a piece of sheet iron having the required width and length, its two ends being dove-tailed as shown at $u_4$ and $u_5$ and butt-welded all along the edge of the dove-tail connection. In this way the resistance of the drum to the stresses to which it is subjected is substantially increased. Further, the portion $u_1$ of the drum is formed with ribs $u_6$ which may be obtained by milling. Instead of one dove-tail, a plurality of such connections may be provided along the connecting ends of the strip of sheet metal used for the cylindrical portion $u_1$, for instance such as shown in Figure 7.

I wish it to be understood that the invention is not limited to the details hereinbefore given by way of example as the same may be modified in various respects without in any way departing from the spirit of the invention.

What I claim is:—

1. Supporting frame for the operating spindles of brake shoes for wheels of motor and other vehicles comprising two end supports ($h$, I) made of sheet iron, a boss ($c$) on which they are directly supported and tubes ($g_1$, $g_2$) which they directly support, the said sheet iron supports having flanges which are edge welded to the boss ($c$) and flanges which are edge welded to the tubes ($g_1$, $g_2$).

2. Supporting frame for the operating spindles of brake shoes for wheels of motor and like vehicles as claimed in claim 1, in which one of the end supports is made hollow, as set forth.

3. A self-contained unit for attachment to the rear axle of a motor or like vehicle comprising in combination a supporting boss ($c$), two flanged sheet iron supports ($h$, I) edge welded to said boss, tubes ($g_1$, $g_2$) to which the said flanged sheet iron supports are edge welded, spindles ($f_1$, $f_2$) mounted on the said tubes ($g_1$, $g_2$) a cylindrical and a cam-like extension ($j_1$, $k_1$—$j_2$, $k_2$) on the said spindles, two pairs of brake shoes, mounted on the said cylindrical and cam-like extensions of the spindles ($f_1$, $f_2$) and each made of strips of sheet iron welded at their edges, some of which strips have flanges to allow edge-welding being effected, and springs between the brake shoes of each pair, as set forth.

4. A self-contained unit for attachment to the rear axle of a motor or like vehicle comprising in combination a supporting boss ($c$), main supporting spring, means for attaching the latter spring to the said boss, two flanged sheet iron supports ($h$, I) edge-welded to said boss, tubes ($g_1$, $g_2$) to which the said flanged sheet iron supports are edge-welded, spindles ($f_1$, $f_2$) mounted on the said
5 tubes ($g_1$, $g_2$) a cylindrical and a cam-like extension ($j_1k_1$—$j_2k_2$) on the said spindles, two pairs of brake shoes mounted on the said cylindrical and cam-like extensions of the spindles ($f_1$, $f_2$) and each made of strips of sheet iron welded at their edges, some of 10 which strips have flanges to allow edge-welding being effected, and springs between the brake shoes of each pair, as set forth.

In testimony whereof I have signed my name to this specification.

JENÖ FEJES.